United States Patent
Gomi et al.

(10) Patent No.: US 8,411,157 B2
(45) Date of Patent: Apr. 2, 2013

(54) SOLID-STATE IMAGE PICKUP DEVICE AND IMAGE PICKUP DEVICE

(75) Inventors: Yuichi Gomi, Tokyo (JP); Hideki Kato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/350,223

(22) Filed: Jan. 13, 2012

(65) Prior Publication Data

US 2012/0182455 A1 Jul. 19, 2012

(30) Foreign Application Priority Data

Jan. 18, 2011 (JP) ................. P2011-007777

(51) Int. Cl.
*H04N 5/225* (2006.01)
*H04N 5/335* (2006.01)
*H04N 5/235* (2006.01)
(52) U.S. Cl. ............... 348/220.1; 348/308; 348/222.1
(58) Field of Classification Search ......... 348/220.1, 348/221.1, 222.1, 308, 333.01, 333.11
See application file for complete search history.

(56) References Cited

U.S. PATENT DOCUMENTS 8,130,279 B2 * 3/2012 Masaki .................. 348/220.1
2006/0077282 A1 * 4/2006 Kido et al. .............. 348/362
2008/0036856 A1 * 2/2008 Yamada et al. ........... 348/72
2009/0033783 A1 * 2/2009 Ota ....................... 348/308
2010/0194922 A1 * 8/2010 Honda et al. .......... 348/231.99
2010/0194958 A1 * 8/2010 Honda et al. .......... 348/311

FOREIGN PATENT DOCUMENTS

JP 11-261896 A 9/1999
JP 2010-183195 A 8/2010

* cited by examiner

*Primary Examiner* — Tuan Ho
*Assistant Examiner* — Selam Gebriel
(74) *Attorney, Agent, or Firm* — Westerman, Hattori, Daniels & Adrian, LLP

(57) ABSTRACT

A solid-state image pickup device includes a pixel unit in which pixels are arranged in a two-dimensional manner, the pixels including a photoelectric conversion element, a charge holding unit, a transmission unit, and a first output unit and a second output unit; a second processing unit; and a control unit configured to control exposure of the pixels such that exposure periods for still images of all pixels constituting an area to be read are equal to one another, and control reading of the still image signal and reading of the moving image signal in units of fields, the all pixels constituting the area to be read being divided into a plurality of fields, in such a manner that the still image signal is to be read from both the first output unit and the second output unit in units of fields.

4 Claims, 15 Drawing Sheets

ROW FROM WHICH PIXEL SIGNAL IS READ

SOLID-STATE IMAGE PICKUP DEVICE AND IMAGE PICKUP DEVICE

BACKGROUND OF THE INVENTION

1. Field of the Invention

The present invention relates to a solid-state image pickup device applied to a digital still camera, a digital video camera and the like, and an image pickup device including the solid-state image pickup device.

Priority is claimed on Japanese Patent Application No. 2011-007777, filed Jan. 18, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, since the performance of a MOS type solid-state image pickup element capable of integrating a peripheral circuit into a chip has significantly improved, the MOS type solid-state image pickup element has been widely proliferated, in place of a CCD type solid-state image pickup element. In the MOS type image pickup element, a plurality of pixels arranged in a two-dimensional manner are provided on the image capturing surface thereof, wherein each pixel converts incident light into signal charge to generate a pixel signal (an image signal). A driving method of the MOS type solid-state image pickup element includes a rolling shutter method in which an exposure start time and an exposure end time are different from in each pixel, and a global shutter method in which the exposure start time and the exposure end time are the same in all pixels.

A MOS type solid-state image pickup element employing the global shutter method includes a photoelectric conversion unit, such as a photodiode, configured to generate a signal charge corresponding to an exposure light amount, a charge holding unit (a charge accumulation unit) configured to temporarily accumulate the signal charge generated in the photoelectric conversion unit, a switching transistor configured to transmit or reset a signal charge, and the like.

FIG. 13 illustrates the configuration of a pixel 100 arranged in a two-dimensional manner on an image capturing surface of a MOS type solid-state image pickup element employing a global shutter method. A photodiode (PD) 101 is a photoelectric conversion element configured to convert incident light into a signal charge (photoelectric conversion) and accumulate the signal charge. A transmission transistor 102 is a transistor configured to transmit the signal charge generated in the photodiode 101 to a charge holding unit (FD) 103. The charge holding unit 103 is floating diffusion (FD) configured to hold the signal charge accumulated in the photodiode 101. An FD reset transistor 104 is a transistor configured to reset (initialize) the potential (that is, signal charge) of the charge holding unit 103.

An amplifying transistor 105 is a transistor configured to amplify and read the voltage level of the charge holding unit 103. A select transistor 106 is a transistor configured to select a pixel and transfer the output of the amplifying transistor 105 to a vertical signal line 114. A PD reset transistor 107 is a transistor configured to reset (initialize) the potential (that is, the signal charge) of the photodiode 101. Remaining elements, other than the photodiode 101, are shielded from light.

A power line 110 is configured to supply a power supply voltage VDD to each pixel, and is electrically connected to a drain terminal of the amplifying transistor 105, a drain terminal of the FD reset transistor 104, and a drain terminal of the PD reset transistor 107. An FD reset line 111 is a signal line configured to receive an FD reset pulse φRMi (i denotes a row number and has the same meaning in the following description) for resetting the charge holding units 103 in pixels of one row, and is electrically connected to gate terminals of the FD reset transistors 104 in the pixels of one row. A transmission line 112 is a signal line configured to receive a row transmission pulse φTRi for transmitting the signal charge generated in the photodiodes 101 in the pixels of one row to the charge holding units 103 in the pixels, and is electrically connected to gate terminals of the transmission transistors 102 in the pixels of one row.

A PD reset line 115 is a signal line configured to receive a PD reset pulse φRPDi for resetting the photodiodes 101 in the pixels of one row, and is electrically connected to gate terminals of the PD reset transistors 107 in the pixels of one row. A selection line 113 is a signal line configured to receive a row selection pulse φSEi for selecting the pixels of one row, and is electrically connected to gate terminals of the select transistors 106 in the pixels of one row. As described above, with such a pixel configuration using the five transistors, a photoelectric conversion function, a reset function, an amplification read function, a temporary memory function, and a selection function are performed.

FIG. 14 illustrates a configuration in which the pixels illustrated in FIG. 13 are arranged on an image capturing surface of a solid-state image pickup element in 3 rows×3 columns. In FIG. 14, a pixel unit 200 has a configuration in which pixels 100 are two-dimensionally arranged in a 3×3 matrix form. Each pixel 100 has a configuration illustrated in FIG. 13.

A vertical scanning circuit 300 controls the driving of the pixel unit 200 in units of rows. In order to perform this driving control, the vertical scanning circuit 300 includes unit circuits 301-1, 301-2, and 301-3, wherein the number of the unit circuits is the same as the number of rows. Furthermore, each unit circuit includes control units 302-i, 303-i, 304-i, and 305-i (i=1, 2, 3).

The control unit 302-i controls the FD reset pulse φRMi (i=1, 2, 3), which resets the charge holding units 103 in pixels of one row, through the FD reset line 111 independently in each row. The control unit 303-i controls the row transmission pulse φTRi (i=1, 2, 3), which transmits a signal charge of the pixels 100 of one row to the charge holding units 103 of the pixels 100, through the transmission line 112 independently in each row. The control unit 304-i controls the PD reset pulse φRPDi (i=1, 2, 3), which resets the photodiodes 101 of the pixels 100 of one row, through the PD reset line 115 independently in each row. The control unit 305-i controls the row selection pulse φSEi (i=1, 2, 3), which selects the pixels 100 of one row from which signals are read, through the selection line 113 independently in each row. Signals of the pixels 100 of a row selected by the row selection pulse φSEi are output to vertical signal lines 114 provided corresponding to columns.

Power lines 150 are provided corresponding to the columns and connected to the vertical signal lines 114, thereby forming source follower circuits together with the amplifying transistors 105 in the pixels 100. Column processing circuits 350 are provided corresponding to the columns and perform a clamp operation or an amplification operation with respect to pixel signals output to the vertical signal lines 114. A horizontal reading circuit 400 selects a pixel column from which pixel signals are read, and outputs the pixel signals from the pixel column through an output terminal 410. An analog-to-digital (AD) converter 500 performs AD conversion with respect to the pixel signals output from the output terminal 410. A frame memory 600 holds the pixel signals having passed through the AD conversion. A difference circuit 700 performs a difference process (a subtraction process) with respect to the pixel signals output from the AD converter 500 and the pixel signals held by the frame memory 600. In addition the power line 110 configured to supply the power supply voltage VDD is not illustrated in FIG. 14.

The following description will be given based on an operation for reading pixel signals using the global shutter method when the MOS type solid-state image pickup element illustrated in FIG. 14 is applied to the image capturing of a still image by a digital camera and the like. FIG. 15 illustrates an operation performed using the global shutter method. For the purpose of convenience, a description will be given using a solid-state image pickup element in which pixels are two-dimensionally arranged in a 3×3 matrix form, similarly to FIG. 14.

If a photographing start signal is input, the PD reset pulses φRPDi of all rows are changed from an "L" level to an "H" level and thus the PD reset transistors 107 of all pixels 100 are turned on, so that the photodiodes 101 of all pixels 100 are reset. Next, the FD reset pulse φRMi of a first row is changed from an "L" level to an "H" level and thus the FD reset transistor 104 of the first row is turned on, so that the charge holding unit 103 of the first row is reset.

Next, after the FD reset pulse φRMi of the first row is changed from an "H" level to an "L" level and thus the FD reset transistor 104 is turned off, the row selection pulse φSEi of the first row is changed from an "L" level to an "H" level and thus the select transistor 106 of the first row is turned on, so that a voltage (a reset level) of the charge holding unit 103 of the first row is output to the horizontal reading circuit 400 through the column processing circuit 350 as a reset signal. The horizontal reading circuit 400 sequentially outputs reset signals through the output terminal 410 in the horizontal direction.

The output reset signal of the pixel 100 of the first row is A/D converted by the AD converter 500, and is output to and held in the frame memory 600. Even after a second row, reset signals are read, and reset signals of all pixels 100 are held in the frame memory 600, similarly to the first row.

Next, the PD reset pulses φRPDi of all rows are changed from an "H" level to an "L" level and thus the PD reset transistors 107 of all pixels 100 are turned off, so that the photodiodes 101 of all pixels 100 start to accumulate signal charge. Accordingly, exposure (signal accumulation) of all pixels 100 is started. If a desired accumulation time elapses, the row transmission pulses φTRi of all rows are changed from an "L" level to an "H" level and thus the transmission transistors 102 of all pixels 100 are turned on, so that a signal charge accumulated in the photodiodes 101 of all pixels 100 is transmitted to the charge holding units 103. That is, the exposure (signal accumulation) is completed. The period from the charge accumulation start to the charge accumulation end corresponds to an exposure period (an accumulation period).

Immediately after the transmission operation of the signal charge is completed, the PD reset pulses φRPDi of all rows are changed from an "L" level to an "H" level and thus the PD reset transistors 107 of all pixels 100 are turned on, so that the photodiodes 101 of all pixels 100 enter a reset state. Next, the row selection pulse φSEi of the first row is changed from an "L" level to an "H" level and thus the select transistor 106 of the first row is turned on, so that a voltage (an optical signal level) of the charge holding unit 103 of the first row is output to the horizontal reading circuit 400 through the column processing circuit 350 as an optical signal. The horizontal reading circuit 400 sequentially outputs optical signals through the output terminal 410 in the horizontal direction.

The output optical signal of the pixel 100 of the first row is A/D converted by the AD converter 500, and is output to the difference circuit 700. The difference circuit 700 obtains a difference between the optical signal of the pixel 100 of the first row and the reset signal of the pixel 100 of the first row held in the frame memory 600, extracts only an optical signal component, and outputs the optical signal component to a circuit of a subsequent stage as an image capturing signal. In this operation, it is possible to remove reset noise of the charge holding unit 103, resulting in the achievement of a signal with a high S/N.

Next, even after the second row, an operation similar to the first row is performed, so that pixel signals of all pixels 100 are read. These signals are processed in an image processing circuit of a subsequent stage (not illustrated), resulting in the generation of a still image. Through the above-mentioned operation, it is possible to perform a global shutter operation for simultaneously performing exposure and charge accumulation in all pixels. Technology related to the MOS type solid-state image pickup element has been disclosed in Japanese Unexamined Patent Application, First Publication No. 11-261896.

A general digital camera is powered on, regularly performs image capturing in units of frames to generate a moving image signal, and displays a live view image (a moving image) on a display unit based on the generated moving image signal. During the display of the live view image, if a user gives a photographing instruction which is an acquirement instruction of a still image, the digital camera stops generating the moving image signal, performs photographing to generate a still image signal, and records the generated still image signal on a recording medium. At the time of the generation of the still image signal, for example, the global shutter operation is performed.

However, since it is not possible to update the live view image at the time of photographing of the still image, a phenomenon in which the same image is displayed on the display unit in the period for which update is not possible, or no image is displayed due to a blackout of the display unit may occur. Furthermore, in the above-mentioned global shutter operation, since it is necessary to perform both a read operation for a reset signal before exposure and a read operation for an optical signal after the exposure, a sequence period necessary for photographing one still image is increased due to an increase in the number of pixels.

In order to solve these problems, Japanese Unexamined Patent Application, First Publication No. 2010-183795 (for example, FIG. 18 to FIG. 21) discloses a method in which pixels of a solid-state image pickup element are divided into a plurality of pixel groups, two output systems for a still image and a moving image (live view) are provided, and a pixel group not used for reading a still image signal is used for reading a moving image signal, so that the reading of the still image signal and the reading of the moving image signal are simultaneously performed.

In the related art, in the case of performing the live view (the moving image) display during the photographing of the still image, the still image signal and the moving image signal are simultaneously read, so that it is possible to reduce a period for which the live view image may not be updated. However, of the two output systems, since one is fixed for reading the still image signal, the other is fixed for reading the moving image signal, and since the reading of the still image signal having a large number of pixels is used only for one output system, there is a limitation in reducing a still image photographing time.

SUMMARY

The present invention provides a solid-state image pickup device and an image pickup device, capable of reducing a still image photographing time.

A solid-state image pickup device may include: a pixel unit in which pixels are arranged in a two-dimensional manner, the pixels including a photoelectric conversion element configured to convert light into signal charge and accumulating the signal charge, a charge holding unit configured to hold the signal charge accumulated in the photoelectric conversion element, a transmission unit configured to transmit the signal charge accumulated in the photoelectric conversion element to the charge holding unit, and a first output unit and a second output unit configured to output a pixel signal as a still image signal or a moving image signal based on the signal charge held in the charge holding unit; a first processing unit configured to read and process the still image signal or the moving image signal which is output from the first output unit; a second processing unit configured to read and process the still image signal or the moving image signal which is output from the second output unit; and a control unit configured to control exposure of the pixels such that exposure periods for still images of all pixels constituting an area to be read are equal to one another, and control reading of the still image signal and reading of the moving image signal in units of fields, the all pixels constituting the area to be read being divided into a plurality of fields, in such a manner that the still image signal is to be read from both the first output unit and the second output unit in units of fields in at least one of a plurality of periods in which the still image signal of one field is read, and the moving image signal is to be read from at least one of the first output unit and the second output unit in units of fields in a plurality of periods in which the moving image signal of one field is read.

In the solid-state image pickup device, the control unit may control the reading of the moving image signal in such a manner that the moving image signal is to be read from both the first output unit and the second output unit in units of fields in at least one of the plurality of periods in which the still image signal of one field is read.

The solid-state image pickup device may set a first mode and a second mode. If the first mode is set, then the control unit may control the reading of the still image signal in such a manner that the still image signal is to be read from one of the first output unit and the second output unit in units of fields in the plurality of periods in which the still image signal of one field is read and controls the reading of the moving image signal in such a manner that the moving image signal is to be read from a remaining one of the first output unit and the second output unit in units of fields in the plurality of periods in which the moving image signal of one field is read. If the second mode is set, then the control unit may control the reading of the still image signal in such a manner that the still image signal is to be read from both the first output unit and the second output unit in units of fields in at least one of the plurality of periods in which the still image signal of one field is read, and controls the reading of the moving image signal in such a manner that the moving image signal is to be read from at least one of the first output unit and the second output unit in units of fields in the plurality of periods in which the moving image signal of one field is read.

An image pickup device includes the solid-state image pickup device.

According to the present invention, in at least one of a plurality of periods for which reading of a still image signal is performed in units of fields, the reading of the still image signal is controlled such that the still image signal is read from both the first output unit and the second output unit in units of fields, so that it is possible to reduce a still image photographing time.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
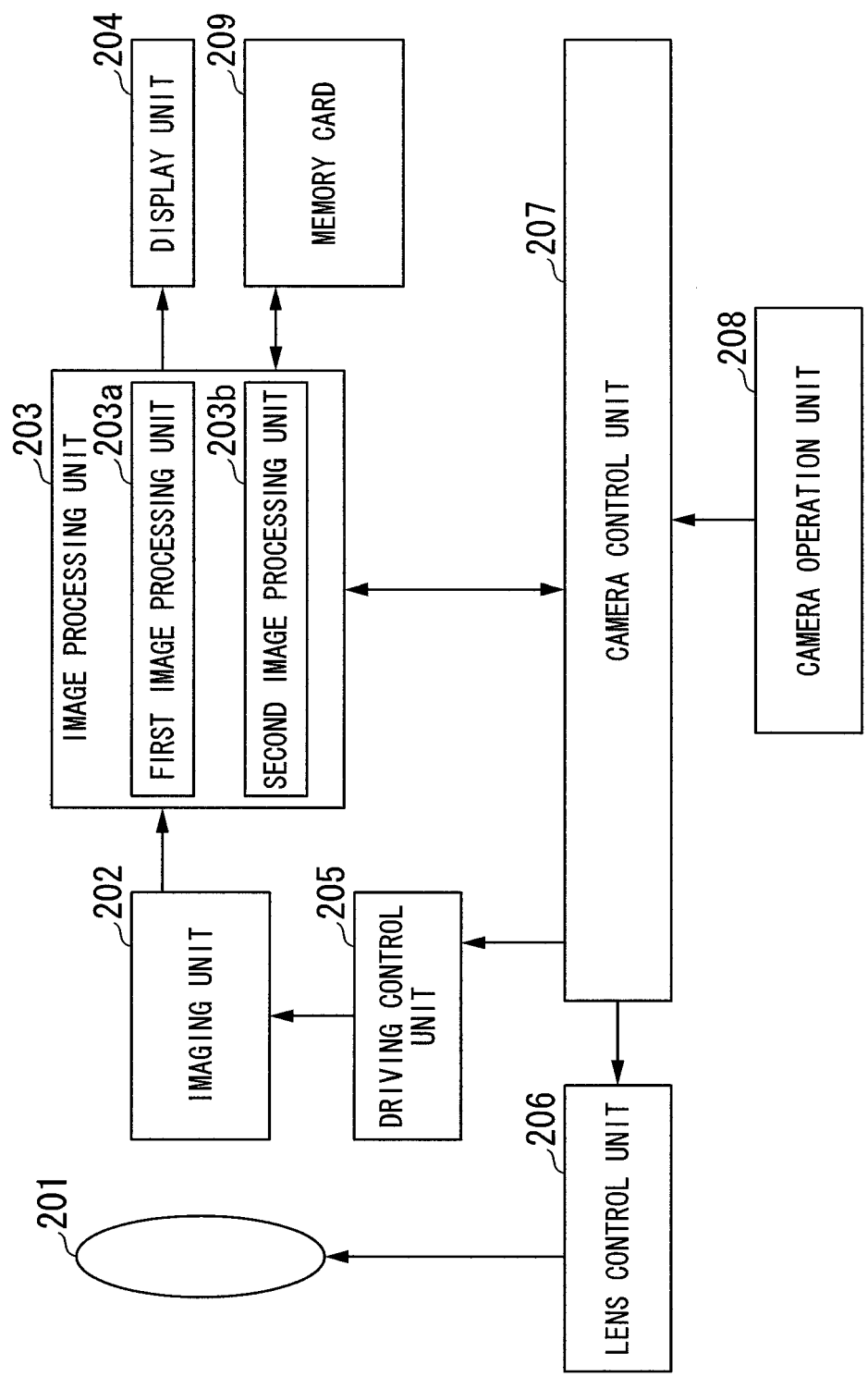
FIG. 1 is a block diagram illustrating the configuration of an image pickup device in accordance with a preferred embodiment of the present invention.

FIG. 1 illustrates the configuration of an image pickup device in accordance with a preferred embodiment of the present invention the image pickup device illustrated in FIG. 1 includes a lens 201, an image pickup unit 202, an image processing unit 203, a display unit 204, a driving control unit 205, a lens control unit 206, a camera control unit 207, and a camera operation unit 208. FIG. 1 illustrates a memory card 209. However, the memory card 209 may not be specific to the image pickup device because it may be configured to be attachable to/detachable from the image pickup device.

The lens 201 is a photographing lens for forming an optical image of an object on an image capturing surface of the image pickup unit 202 constituting the solid-state image pickup element (the solid-state image pickup device). The image pickup unit 202 converts the optical image of the object formed by the lens 201 into a digital image signal through photoelectric conversion, and outputs the digital image signal. The image processing unit 203 performs various types of digital image processing with respect to the image signal output from the image pickup unit 202. The image processing unit 203 includes a first image processing unit 203a configured to process the pixel signal for the purpose of recording, and a second image processing unit 203b configured to process the pixel signal for the purpose of display.

The display unit 204 displays an image based on the pixel signal for display processed by the second image processing unit 203b of the image processing unit 203. The display unit 204 is configured to reproduce and display a still image and to perform moving image (live view) display for displaying in real time an image to be imaged. The driving control unit 205 controls the operation of the image pickup unit 202 based on an instruction from the camera control unit 207. The lens control unit 206 controls a diaphragm or a focal position of the lens 201 based on the instruction from the camera control unit 207.

The camera control unit 207 controls the entire image pickup device. The camera operation unit 208 has various operation members used when a user performs various types of operation input with respect to the image pickup device, and outputs a signal to the camera control unit 207 based on an operation input result. In detail, the camera operation unit 208 is prepared in the form of a power switch for turning on/off the power of the image pickup device, a release button for instructing still image photographing, a still image photographing mode switch for switching a still image photographing mode between a single shot mode and a continuous mode, and the like. The memory card 209 is a recording medium configured to hold the image signal for recording processed by the first image processing unit 203a.

Figure 2:
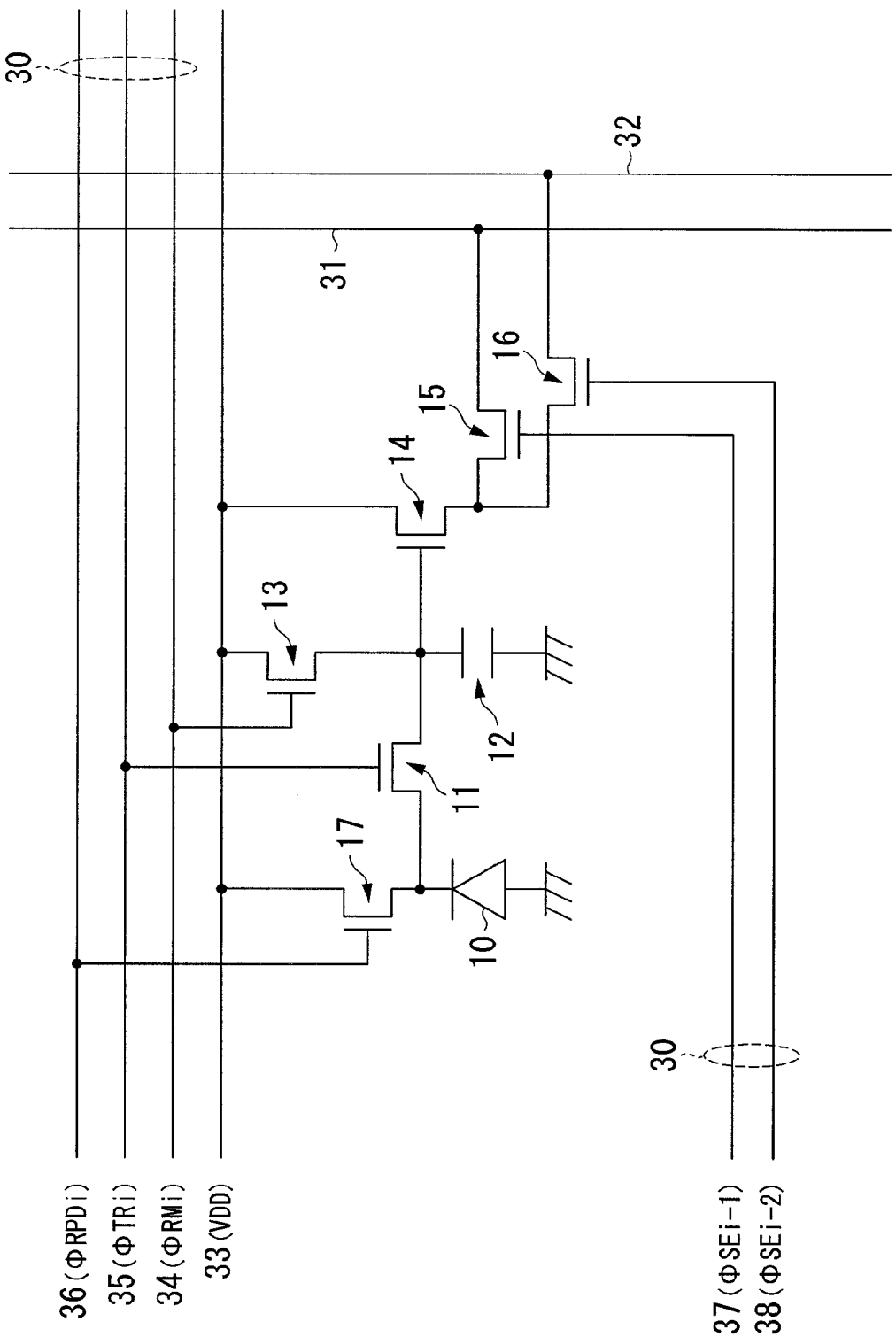
FIG. 2 is a circuit diagram illustrating the configuration of a pixel included in an image pickup device in accordance with a preferred embodiment of the present invention.

Next, the configuration of the image pickup unit 202 will be described. FIG. 2 illustrates the configuration of a pixel used in the image pickup unit 202. A photodiode (PD) 10 is a photoelectric conversion element configured to convert incident light into a signal charge (photoelectric conversion) and accumulate the signal charge. A transmission transistor 11 (a transmission unit) is a transistor configured to transmit the signal charge generated in the photodiode 10 to a charge holding unit (FD) 12. The charge holding unit 12 is floating diffusion (FD) configured to hold the signal charge accumulated in the photodiode 10. An FD reset transistor 13 is a transistor configured to reset (initialize) the potential (that is, the signal charge) of the charge holding unit 12.

An amplifying transistor 14 is a transistor configured to amplify and read the voltage level of the charge holding unit 12. Select transistors 15 and 16 (a first output unit and a second output unit) are transistors configured to select a pixel and transfer the output of the amplifying transistor 14 to vertical signal lines 31 and 32. A PD reset transistor 17 is a transistor configured to reset (initialize) the potential (that is, signal charge) of the photodiode 10. Remaining elements, other than the photodiode 10, are shielded from light.

A power line 33 is configured to supply a power supply voltage VDD to each pixel, and is electrically connected to a drain terminal of the amplifying transistor 14, a drain terminal of the FD reset transistor 13, and a drain terminal of the PD reset transistor 17. An FD reset line 34 is a signal line configured to receive an FD reset pulse $\phi$RMi (i denotes a row number and has the same meaning in the following description) for resetting the charge holding units 12 in pixels of one row, and is electrically connected to gate terminals of the FD reset transistors 13 in the pixels of one row. A transmission line 35 is a signal line configured to receive a row transmission pulse $\phi$TRi for transmitting the signal charge generated in the photodiodes 10 in the pixels of one row to the charge holding units 12 in the pixels, and is electrically connected to gate terminals of the transmission transistors 11 in the pixels of one row.

A PD reset line 36 is a signal line configured to receive a PD reset pulse $\phi$RPDi for resetting the photodiodes 10 in the pixels of one row, and is electrically connected to gate terminals of the PD reset transistors 17 in the pixels of one row. Selection lines 37 and 38 are signal lines configured to receive row selection pulses $\phi$SEi-1 and $\phi$SEi-2 for selecting the pixels of one row, and are electrically connected to gate terminals of the select transistors 15 and 16 in the pixels of one row. The FD reset line 34, the transmission line 35, the PD reset line 36, and the selection lines 37 and 38 constitute a control line group 30.

Figure 3:
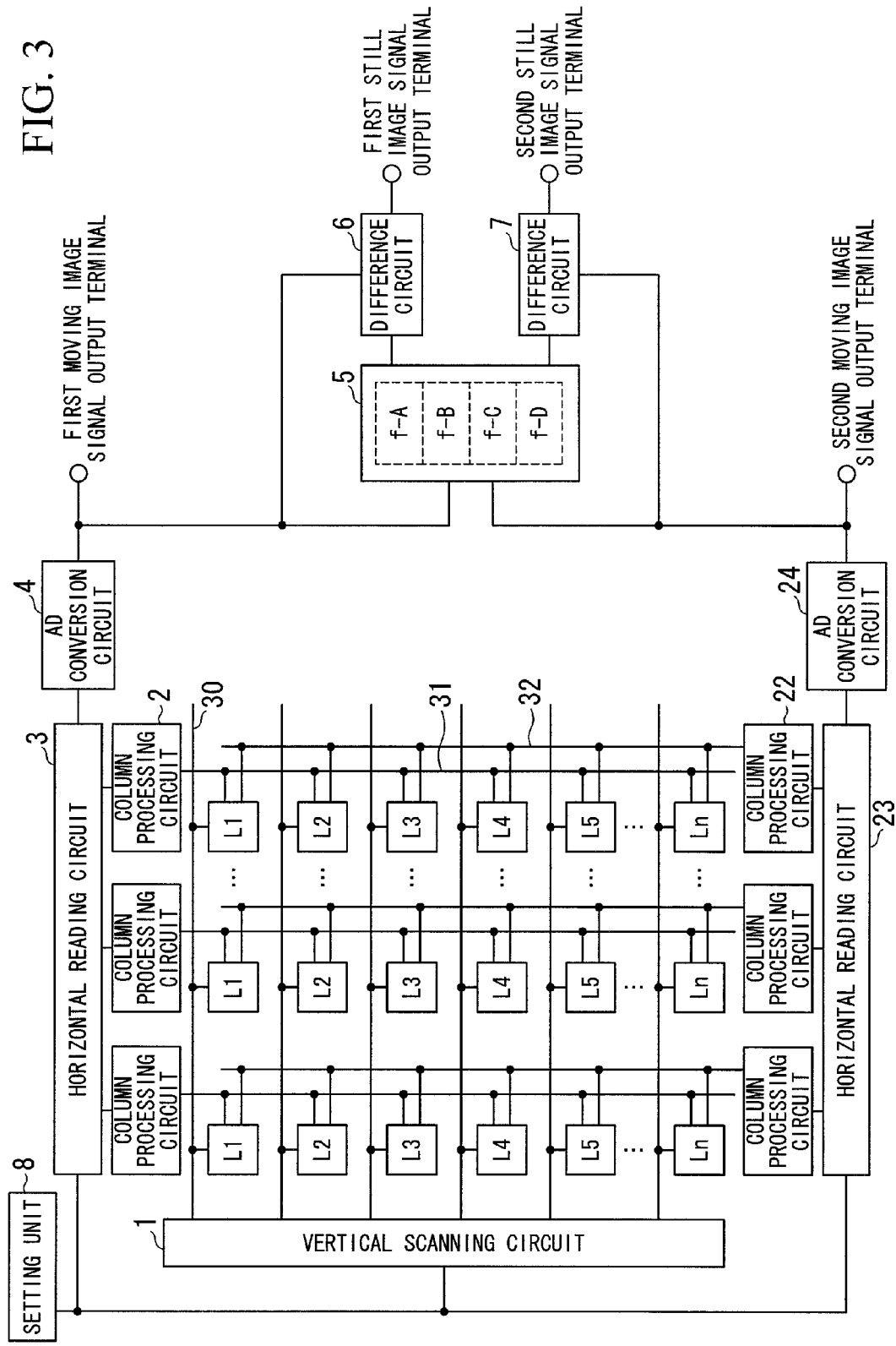
FIG. 3 is a block diagram illustrating the configuration of an image pickup unit included in an image pickup device in accordance with a preferred embodiment of the present invention.

FIG. 3 illustrates the configuration of the image pickup unit 202. The image pickup unit 202 is provided on the image capturing surface thereof with pixels L1 to Ln arranged in a two-dimensional manner, wherein each pixel has a configuration illustrated in FIG. 2. These pixels L1 to Ln constitute a pixel unit.

In the preferred embodiment, an area including all pixels of the image pickup unit 202 is set as an area from which pixel signals are to be read. However, a part of the area including all pixels of the image pickup unit 202 may also be set as an area to be read from which pixel signals are to be read, and the pixel signals may also be read as will be described below. The pixel arrangement illustrated in FIG. 2 is for illustrative purposes only, and it is sufficient if the number of rows and the number of columns are equal to or more than 2.

In order to control pixel driving in units of rows, a vertical scanning circuit 1 (a control unit) controls the FD reset pulse $\phi$RMi, the row transmission pulse $\phi$TRi, the PD reset pulse $\phi$RPDi, and the row selection pulses $\phi$SEi-1 and $\phi$SEi-2 through the control line group 30 (the FD reset line 34, the transmission line 35, the PD reset line 36, and the selection lines 37 and 38 of FIG. 2) independently in each row. Signals of pixels of rows selected by the row selection pulses $\phi$SEi-1 and $\phi$SEi-2 are output to the vertical signal lines 31 and 32 provided corresponding to columns. In addition the power line 33 for supplying the power supply voltage VDD is not illustrated in FIG. 3.

Column processing circuits 2, a horizontal reading circuit 3, an AD conversion circuit 4, a frame memory 5, and a difference circuit 6 constitute a first output system (a first processing unit) that reads and processes pixel signals output from the select transistors 15 in the pixels to the vertical signal lines 31. The column processing circuits 2 are connected to the vertical signal lines 31 of the columns to perform a clamp operation or an amplification operation with respect to pixel signals output from the pixels L1 to Ln.

Each column processing circuit 2 also performs a difference process (a subtraction process) with respect to an optical signal and a reset signal (a CDS operation), in relation to a moving image signal. The horizontal reading circuit 3 selects a pixel column from which pixel signals are to be read, and sequentially outputs the pixel signals from the pixel column to the AD conversion circuit 4, thereby reading the pixel signals.

The AD conversion circuit 4 performs AD conversion with respect to the pixel signals read by the horizontal reading circuit 3. The pixel signals having passed through the AD conversion are output from a first moving image signal output terminal or are held in the frame memory 5. In addition the frame memory 5 is configured to hold pixel signals in four fields f-A, f-B, f-C, and f-D which will be described later. The difference circuit 6 performs a difference process (a subtraction process) with respect to the pixel signals output from the AD conversion circuit 4 and the pixel signals held in the frame memory 5, and outputs resultant signals through a first still image signal output terminal.

Column processing circuits 22, a horizontal reading circuit 23, an AD conversion circuit 24, the frame memory 5, and a difference circuit 7 constitute a second output system (a second processing unit) that reads and processes pixel signals output from the select transistors 16 in the pixels to the vertical signal lines 32. The column processing circuits 22 are connected to the vertical signal lines 32 of the columns to perform a clamp operation or an amplification operation with respect to the pixel signals output from the pixels L1 to Ln. Each column processing circuit 22 also performs a difference process (a subtraction process) with respect to an optical signal and a reset signal (a CDS operation), in relation to a moving image signal. The horizontal reading circuit 23 selects a pixel column from which pixel signals are to be read, and sequentially outputs the pixel signals from the pixel column to the AD conversion circuit 24, thereby reading the pixel signals.

The AD conversion circuit 24 performs AD conversion with respect to the pixel signals read by the horizontal reading circuit 23. The pixel signals having passed through the AD conversion are output from a second moving image signal output terminal or are held in the frame memory 5. The difference circuit 7 performs a difference process (a subtraction process) with respect to the pixel signals output from the AD conversion circuit 24 and the pixel signals held in the frame memory 5, and outputs resultant signals through a second still image signal output terminal.

In the preferred embodiment as described above, the two output systems are provided to read pixel signals from pixels, process the pixel signals, and output the processed pixel signals. Using the two output systems, it is possible to simultaneously read pixel signals from pixels of a plurality of different rows and output the read pixel signals.

A setting unit 8 sets a reading mode of the pixel signal in the image pickup unit 202 as a first reading mode or a second reading mode which will be described later, and controls the vertical scanning circuit 1 and the horizontal reading circuits 3 and 23 such that the vertical scanning circuit 1 and the horizontal reading circuits 3 and 23 perform operations in the set reading mode.

Next, the operation of the image pickup unit 202 will be described. It is possible for the image pickup unit 202 to perform a global shutter operation and a rolling shutter operation. Hereinafter, these operations will be described.

Figure 4:
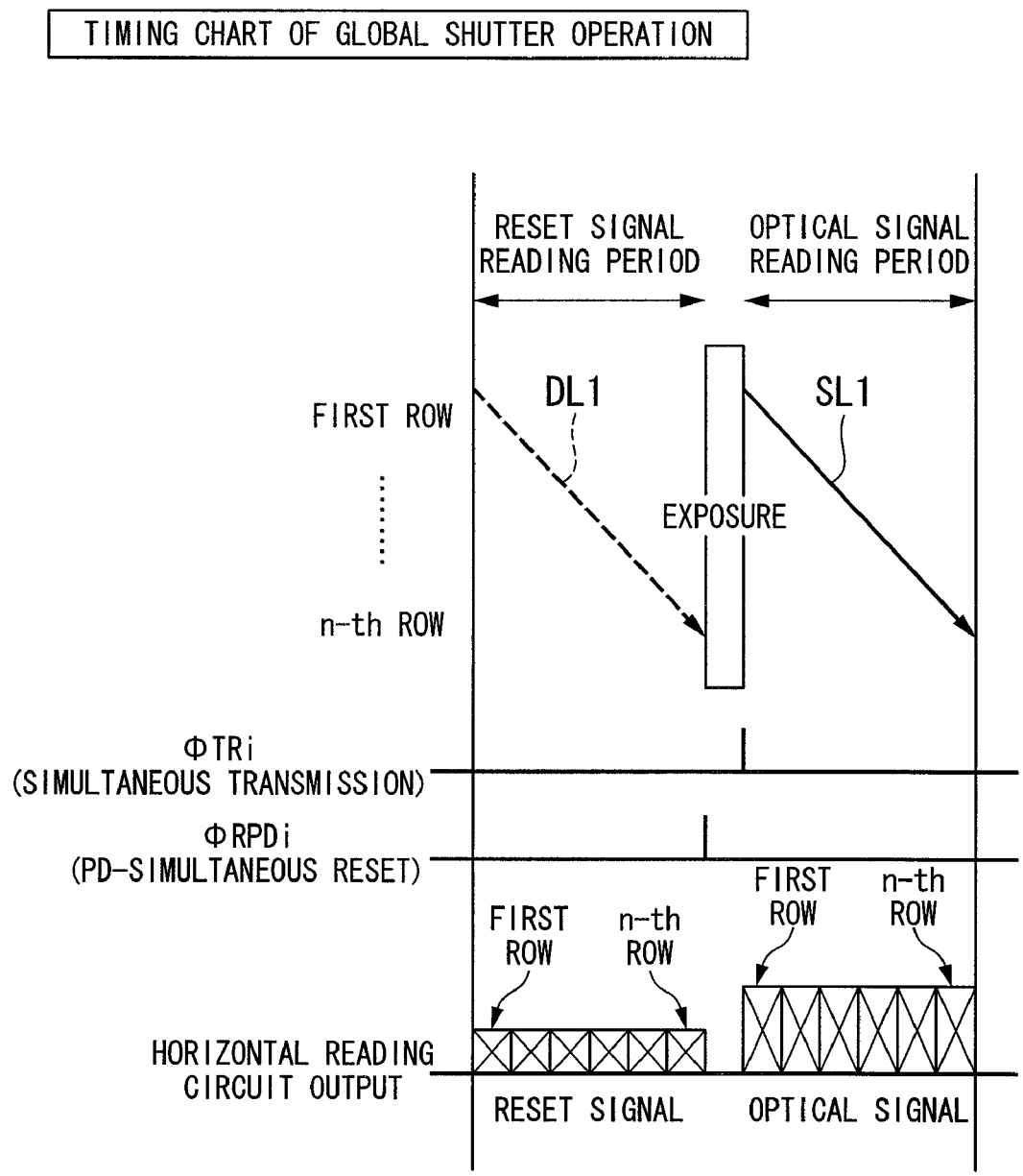
FIG. 4 is a timing chart illustrating a global shutter operation of an image pickup unit included in an image pickup device in accordance with a preferred embodiment of the present invention.

FIG. 4 illustrates a global shutter operation used at the time of a still image photographing operation. In FIG. 4, a horizontal axis denotes time. A broken line DL1 and a solid line SL1 illustrate read timings of pixel signals in each row. Furthermore, FIG. 4 also illustrates timings at which the row transmission pulse φTRi and the PD reset pulse φRPDi are simultaneously applied to all pixels. FIG. 4 also illustrates an output signal of the horizontal reading circuit. Hereinafter, in order to simply describe an operation, an operation when the first output system of the two output systems is used will be described. An operation when the second output system is used is also similar to this operation.

Before optical signal accumulation (exposure) is performed through the global shutter operation, a potential (a reset level) of the charge holding unit 12 when the charge holding unit 12 has been reset is read in a reset signal reading period. In the reset signal reading period, the FD reset pulse φRMi of a first row is changed from an "L" level to an "H" level and thus the FD reset transistor 13 of the pixel L1 of the first row is turned on, so that the charge holding unit 12 of the pixel L1 of the first row is reset.

Moreover, the row selection pulse φSEi of the first row is changed from an "L" level to an "H" level and thus the select transistor 15 is turned on, so that the reset level is output to the vertical signal line 31 as a reset signal, is output to the frame memory 5 through the column processing circuit 2, the horizontal reading circuit 3, and the AD conversion circuit 4, and is stored in the frame memory 5. An operation similar to the above operation is performed using the first output system or the second output system from the first row to an n-th row (a final row), so that a reset signal reading period is completed.

Next, the PD reset pulses φRPDi of all pixels are changed from an "L" level to an "H" level and thus the PD reset transistors 17 of all pixels are simultaneously turned on, so that the photodiodes 10 of all pixels are simultaneously reset. Then the PD reset pulses φRPDi of all pixels are changed from an "H" level to an "L" level and thus the PD reset transistors 17 of all pixels are simultaneously turned off, so that exposure (charge accumulation) of all pixels starts. If a predetermined exposure period (an accumulation period) passes after the exposure starts, the row transmission pulses φTRi of all pixels are changed from an "L" level to an "H" level, so that the signal charge accumulated in the photodiodes 10 during the exposure period is simultaneously transmitted to the charge holding units 12. That is, the exposure of all pixels is simultaneously completed.

After the exposure is completed, potentials (optical signal levels) of the charge holding units 12 are read in an optical signal reading period. In the optical signal reading period, the row selection pulse φSEi-1 of the first row is changed from an "L" level to an "H" level and thus the select transistor 15 is turned on, so that the optical signal level is output to the vertical signal line 31 as an optical signal, and is output to the difference circuit 6 through the column processing circuit 2, the horizontal reading circuit 3, and the AD conversion circuit 4.

The difference circuit 6 obtains a difference between the optical signal of the pixel L1 of the first row and the reset signal of the pixel L1 of the first row, which is held in the frame memory 5, to extract only an optical signal component, and outputs the optical signal component to the image processing unit 203 through the first still image signal output terminal as a still image signal with no noise. An operation similar to the above operation is performed using the first output system or the second output system from the first row to the n-th row (the final row), so that an optical signal reading period is completed and one still image signal is output to the image processing unit 203.

Figure 5:
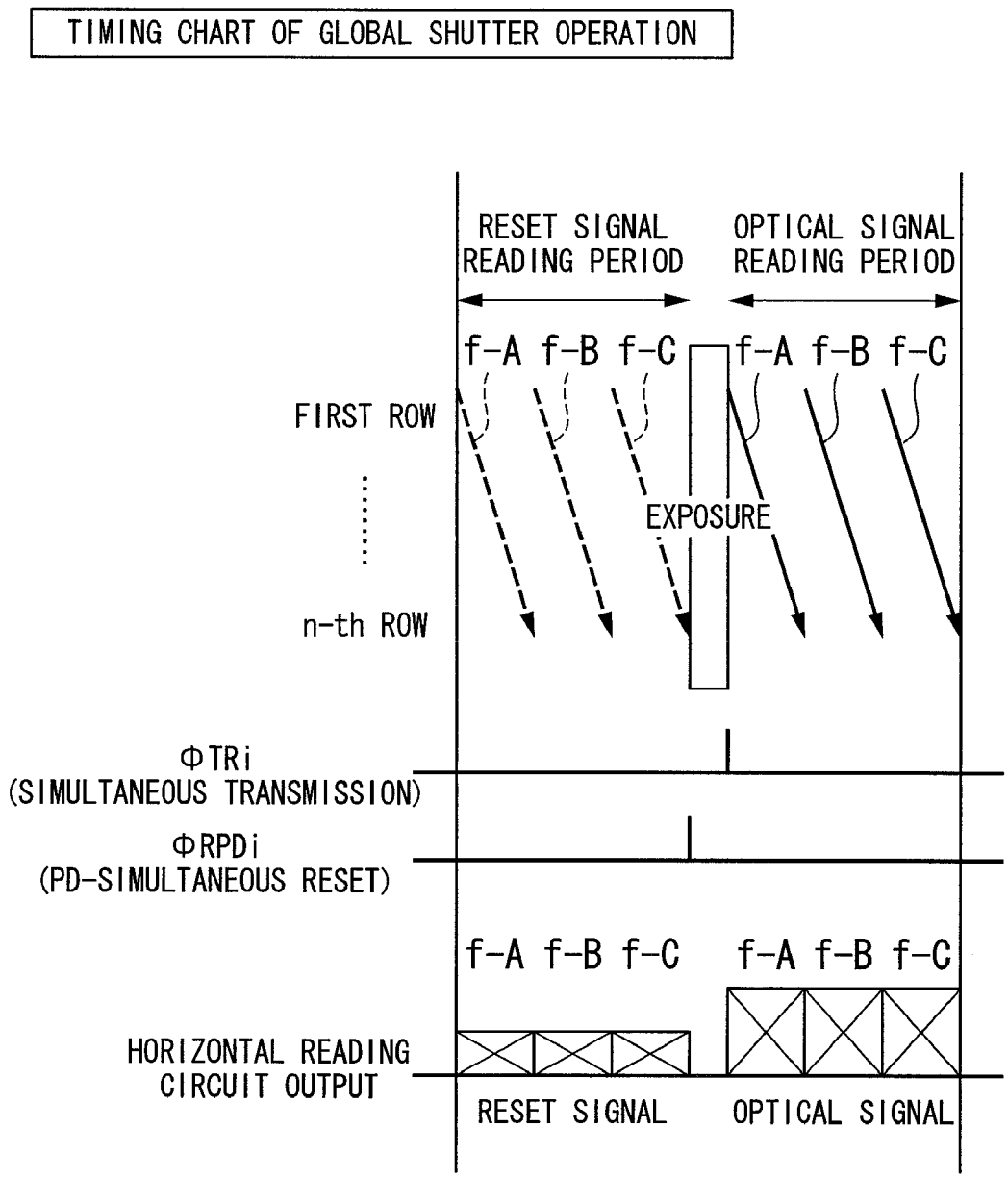
FIG. 5 is a timing chart illustrating a global shutter operation of an image pickup unit included in an image pickup device in accordance with a preferred embodiment of the present invention.
Figure 6:
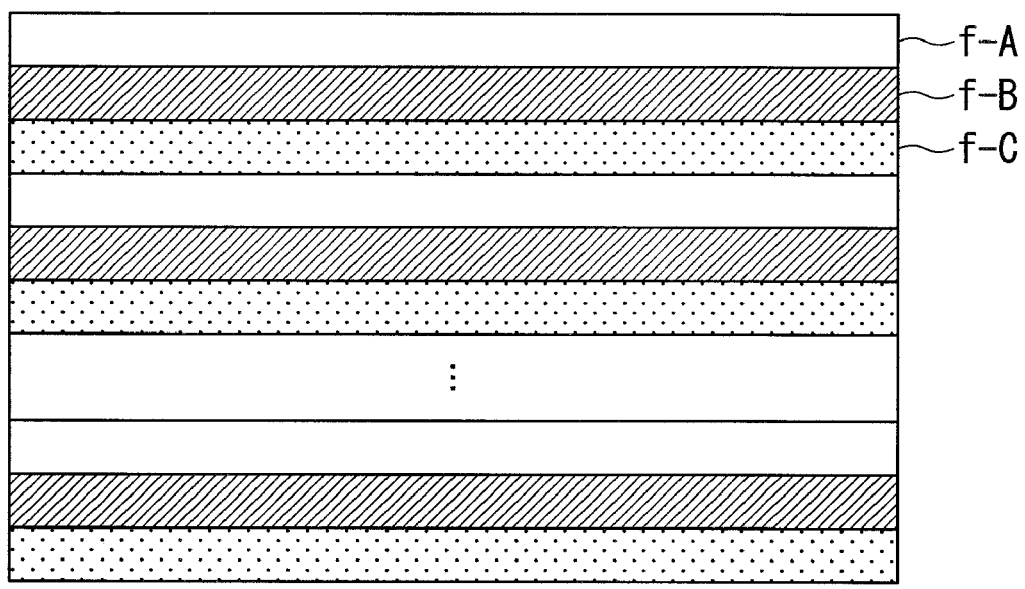
FIG. 6 is a reference diagram illustrating a state in which a pixel included in an image pickup device in accordance with a preferred embodiment of the present invention has been divided into fields.

FIG. 5 illustrates an operation when pixel signals are read in units of fields in the reset signal reading period and the optical signal reading period. The operation illustrated in FIG. 5 is an operation when all pixels have been divided into three fields. In the example illustrated in FIG. 5, all pixels are divided into a first field (f-A) including a pixel group of pixels of a first row, a fourth row, a seventh row, ..., a second field (f-B) including a pixel group of pixels of a second row, a fifth row, an eighth row, ..., and a third field (f-C) including a pixel group of pixels of a third row, a sixth row, a ninth row, ... (refer to FIG. 6).

In the operation illustrated in FIG. 5, a reset signal is read in the reset signal reading period in sequence of the first field (f-A), the second field (f-B), and the third field (f-C), and an optical signal is read in the optical signal reading period in sequence of the first field (f-A), the second field (f-B), and the third field (f-C). That is, the operation illustrated in FIG. 5 is substantially identical to the operation illustrated in FIG. 4, except that an order of pixels from which pixel signals are read is different from that in the operation illustrated in FIG. 4. As described above, in the global shutter operation, it is not necessary to read pixel signals in a row arrangement order from the first row to the final row. Hereinafter, in relation to the reading of the still image signal, the case in which reading is performed through an operation similar to the operation illustrated in FIG. 5 will be described.

Figure 7:
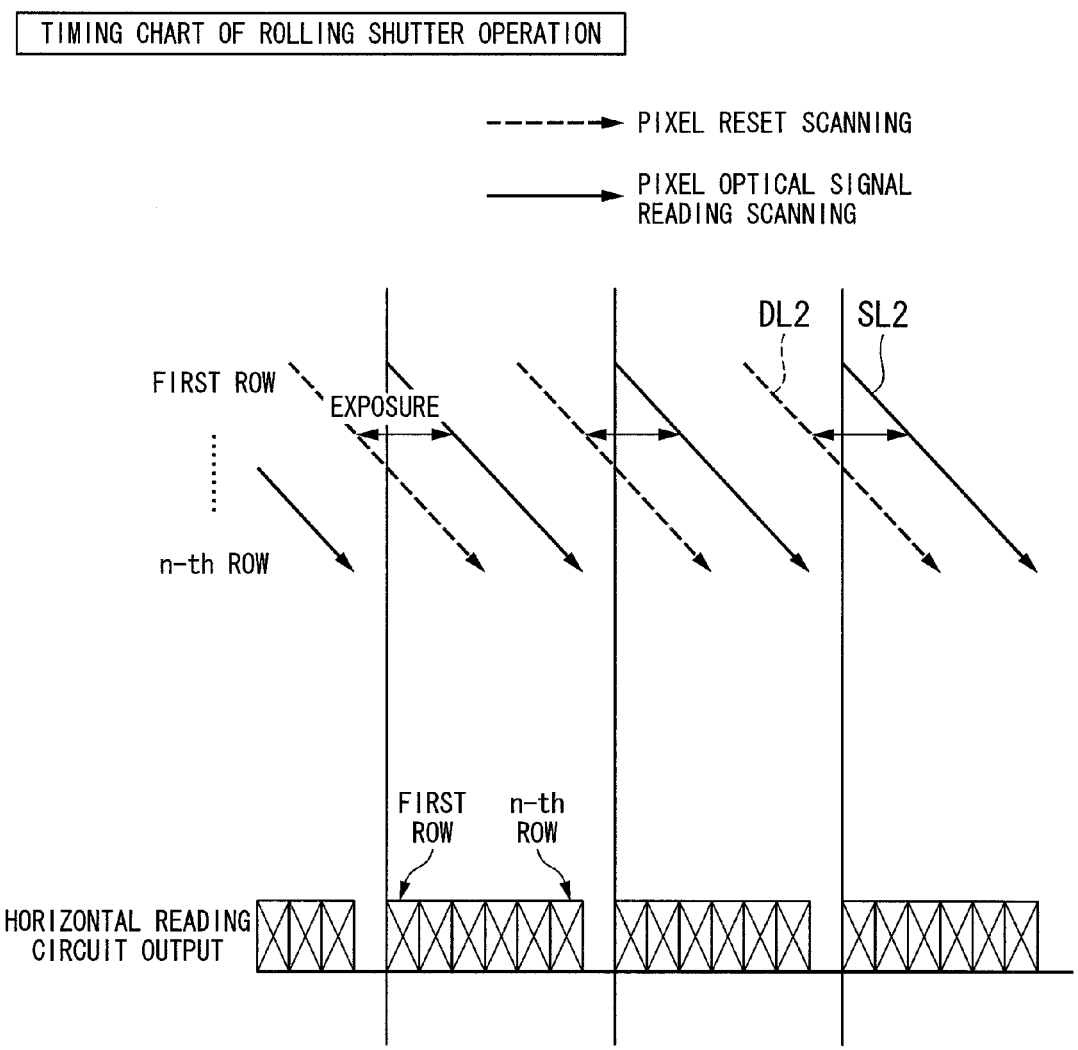
FIG. 7 is a timing chart illustrating a rolling shutter operation of an image pickup unit included in an image pickup device in accordance with a preferred embodiment of the present invention.

FIG. 7 illustrates a rolling shutter operation used at the time of a moving image display operation. In FIG. 7, a horizontal axis denotes time. A broken line DL2 indicates a scanning timing for resetting pixels in each row, and a solid line SL2 indicates a timing for reading an optical signal in each row. Furthermore, FIG. 7 also illustrates an output signal of the horizontal reading circuit. In the rolling shutter operation, since there is no operation for simultaneously applying a control signal to all pixels, the row transmission pulses φTRi and the PD reset pulses φRPDi of all pixels are not illustrated. In the rolling shutter operation the reading of the reset signal and the reading of the optical signal are performed at different times in each row. Hereinafter, in order to simply describe an operation, an operation when the first output system of the two output systems is used will be described. An operation when the second output system is used is also similar to this operation.

The pixel L1 of the first row is reset as follows. First, the FD reset pulse φRMi of the first row is changed from an "L" level to an "H" level and thus the FD reset transistor 13 of the pixel L1 of the first row is turned on, so that the charge holding unit 12 of the pixel L1 of the first row is reset. Moreover, the row transmission pulse φTRi of the first row is changed from an "L" level to an "H" level and thus the transmission transistor 11 of the pixel L1 of the first row is turned on, so that the photodiode 10 is reset through the transmission transistor 11 and the FD reset transistor 13. Then the row transmission pulse φTRi of the first row is changed from an "H" level to an "L" level and thus the transmission transistor 11 of the pixel L1 of the first row is turned off, so that exposure (charge accumulation) of the pixel L1 of the first row starts.

After the exposure starts and a predetermined exposure period passes, the reading of the optical signal is performed. Before the reading of the optical signal is performed, the FD reset pulse φRMi of the first row is changed from an "L" level to an "H" level during the exposure period and thus the FD reset transistor 13 of the pixel L1 of the first row is turned on, so that the charge holding unit 12 of the pixel L1 of the first row is reset. Moreover, the row selection pulse φSEi-1 of the first row is changed from an "L" level to an "H" level and thus the select transistor 15 of the pixel L1 of the first row is turned on, so that the reset level is output to the vertical signal line 31 as a reset signal.

At the completion timing of the exposure period of the first row, the row transmission pulse φTRi of the first row is changed from an "L" level to an "H" level and thus the transmission transistor 11 of the pixel L1 of the first row is turned on, so that the signal charge accumulated in the photodiodes 10 during the exposure period is transmitted to the charge holding unit 12. At this time, since the selection pulse φSEi-1 of the first row is at an "H" level and the select transistor 15 of the pixel L1 of the first row is turned on, an optical signal level based on the signal charge held in the charge holding unit 12 is output to the vertical signal line 31 as an optical signal.

The column processing circuit 2 obtains a difference between the optical signal and the reset signal, which have been output to the vertical signal line 31, to extract only an optical signal component, and outputs a moving image signal with no noise. The moving image signal is output to the image processing unit 203 through the horizontal reading circuit 3, and the AD conversion circuit 4, and the difference circuit 6. An operation similar to the above operation is performed using the first output system or the second output system from the first row to the n-th row (the final row), so that one moving image signal is output to the image processing unit 203.

Figure 8:
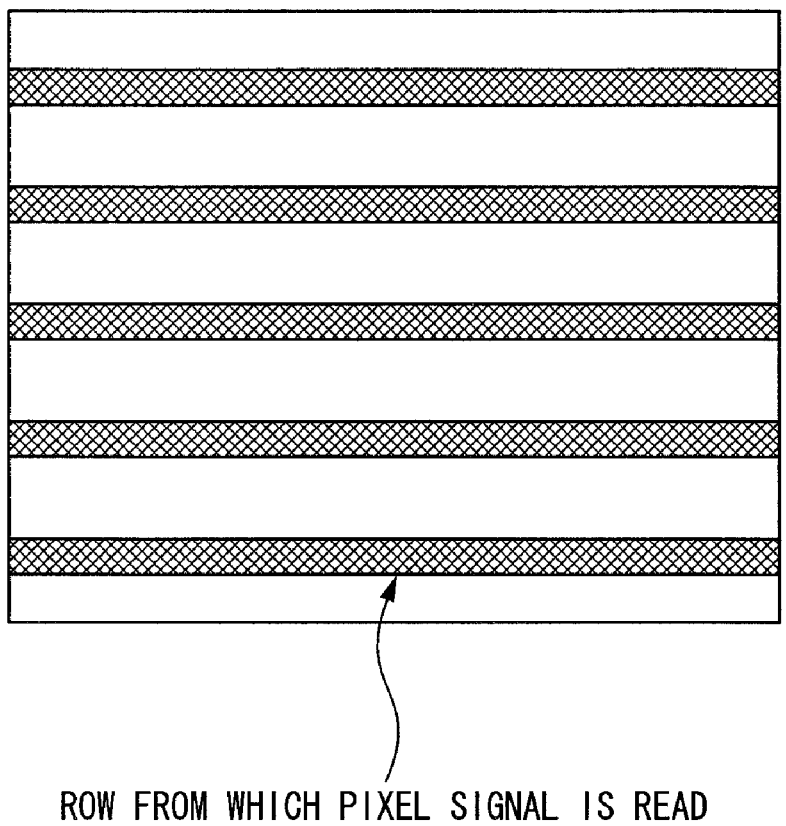
FIG. 8 is a reference diagram illustrating a pixel, from which a pixel signal is read, at the time of a moving image display operation in accordance with a preferred embodiment of the present invention.

In addition, at the time of the moving image display operation, pixel signals are not read from all pixels. As illustrated in FIG. 8, rows from which pixel signals are to be read are thinned out, so that it is possible to reduce the period required for reading pixel signals of one frame.

Next, the operation of the image pickup device will be described. It is possible for the image pickup device of the preferred embodiment to operate by selecting the first reading mode in which the first output system is used in order to read a still image signal and the second output system is used in order to read a moving image signal, and the second reading mode in which both the first output system and the second output system are used in order to read at least one of the still image signal and the moving image signal. It is possible for a user to select the reading mode by operating the camera operation unit 208. The reading mode for the image pickup unit 202 is set by the driving control unit 205 having received an instruction of the reading mode from the camera control unit 207. Furthermore, the reading mode in the image pickup unit 202 is set by the setting unit 8 having received an instruction from the driving control unit 205. After the reading mode is set by the setting unit 8, the vertical scanning circuit 1 and the horizontal reading circuits 3 and 23 read pixel signals according to each reading mode.

Figure 9:
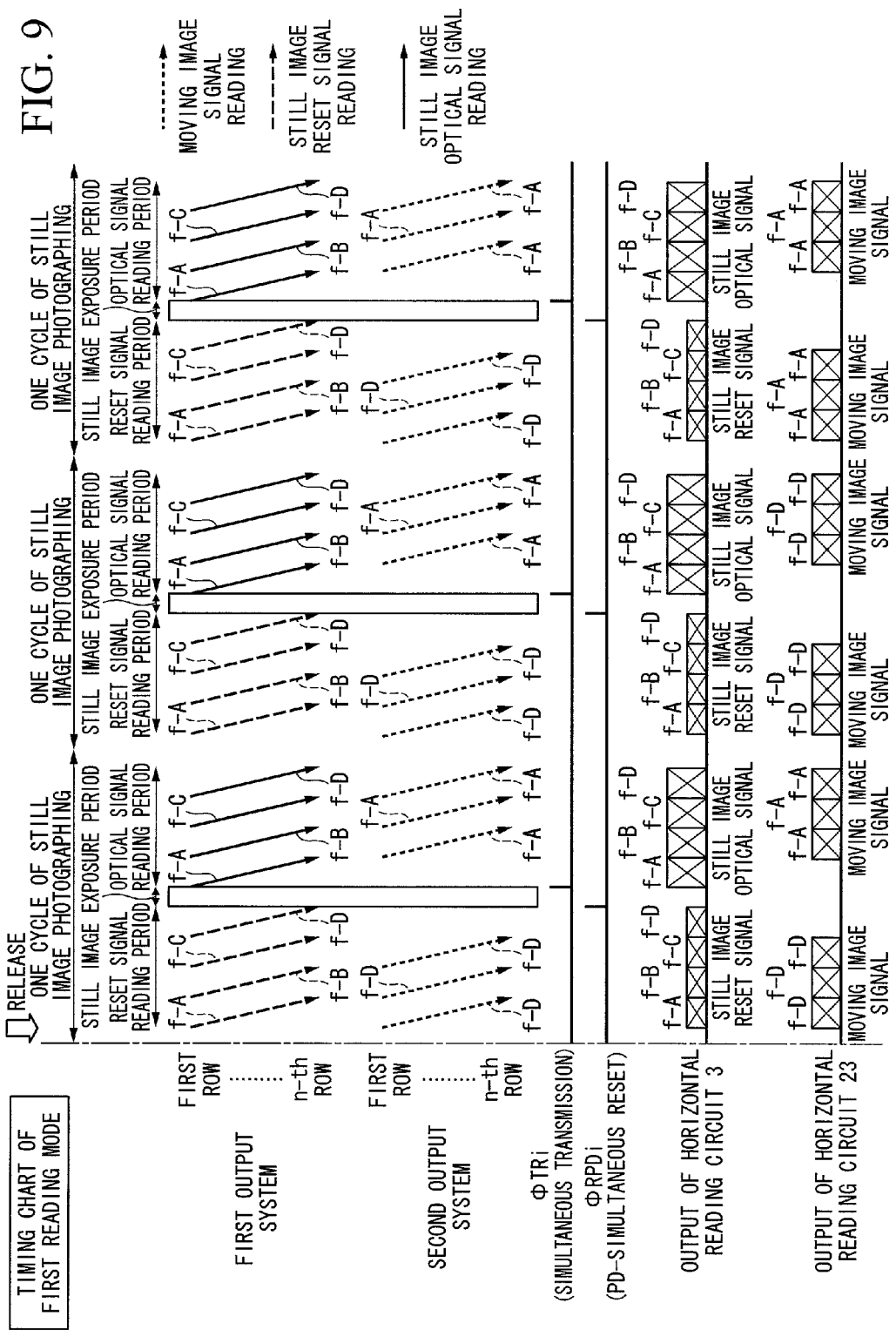
FIG. 9 is a timing chart illustrating the operation of an image pickup device in accordance with a preferred embodiment of the present invention.

FIG. 9 illustrates an operation in the first reading mode. In FIG. 9, a horizontal axis denotes time. FIG. 9 illustrates a pixel signal reading timing using the first output system and a pixel signal reading timing using the second output system. Furthermore, FIG. 9 illustrates timings at which the row transmission pulse φTRi and the PD reset pulse φRPDi are simultaneously applied to all pixels. FIG. 9 illustrates the output signal of the horizontal reading circuit 3 constituting the first output system and the output signal of the horizontal reading circuit 23 constituting the second output system.

Figure 10:
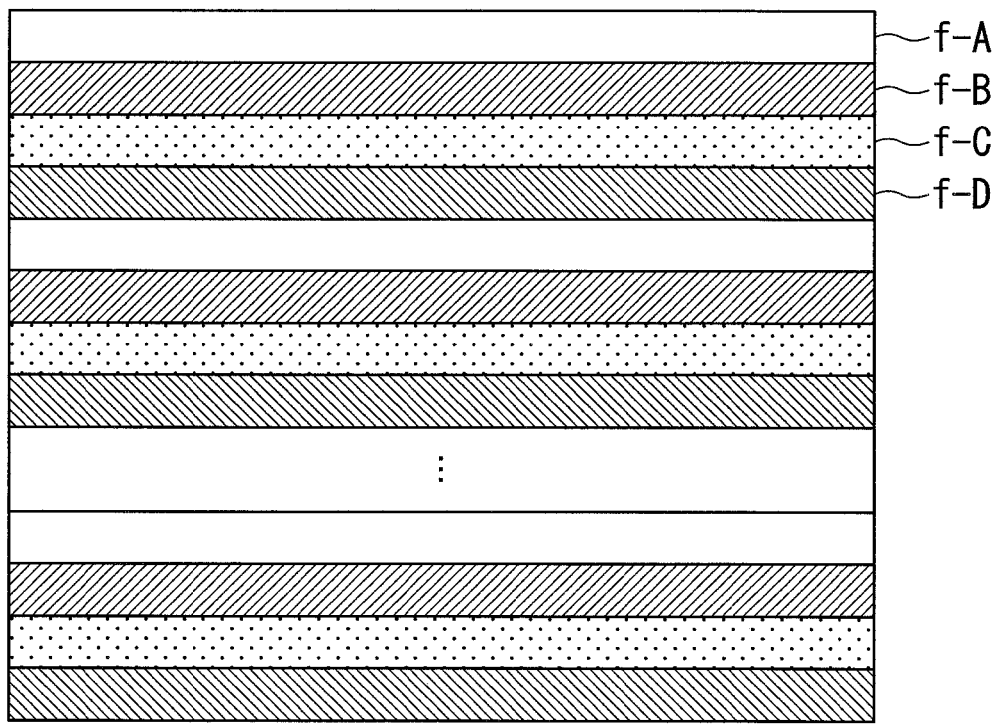
FIG. 10 is a reference diagram illustrating a state in which a pixel included in an image pickup device in accordance with a preferred embodiment of the present invention has been divided into fields.

The operation illustrated in FIG. 9 is an operation when all pixels have been divided into four fields. In the example illustrated in FIG. 9, all pixels are divided into a first field (f-A) including a pixel group of pixels of a first row, a fifth row, a ninth row, . . . , a second field (f-B) including a pixel group of pixels of a second row, a sixth row, a tenth row, . . . , a third field (f-C) including a pixel group of pixels of a third row, a seventh row, an eleventh row, . . . , and a fourth field (f-D) including a pixel group of pixels of a fourth row, an eighth row, a twelfth row, . . . (refer to FIG. 10).

In the first reading mode illustrated in FIG. 9, a still image signal and a moving image signal are read in a parallel manner using different output systems. In the operation illustrated in FIG. 9, the first output system is used and the global shutter operation illustrated in FIG. 5 is performed, so that a reset signal for a still image is read in the reset signal reading period in sequence of the first field (f-A), the second field (f-B), the third field (f-C), and the fourth field (f-D), and an optical signal for a still image is read in the optical signal reading period in sequence of the first field (f-A), the second field (f-B), the third field (f-C), and the fourth field (f-D). The difference circuit 6 generates a still image signal including a difference between an optical signal of each field output from the AD conversion circuit 4 and a reset signal of each corresponding field held in the frame memory 5, and outputs the still image signal through the first still image signal output terminal. The still image signal of each field output from the first still image signal output terminal is processed by the first image processing unit 203a of the image processing unit 203, so that one still image signal is recorded on the memory card 209.

Meanwhile, in the operation illustrated in FIG. 9, the second output system is used and the rolling shutter operation illustrated in FIG. 7 is performed, so that a moving image signal is read while pixels are thinned out using pixels of a field having no relation to the reading of the still image signal. In pixels after the reset signal for a still image is read, it is not preferable to reset the charge holding unit 12 again and read a reset signal for a moving image. Therefore, in the reset signal reading period, before the reset signal for a still image is read from the fourth field (f-D) from which the reset signal for a still image is finally read, a moving image signal is read using the pixels of the fourth field (f-D) and is output from the second moving image signal output terminal.

Furthermore, in the optical signal reading period, since it is not preferable to reset the charge holding unit 12 of a pixel from which no optical signal for a still image is read, the moving image signal is read using the pixels of the first field (f-A) from which the optical signal for a still image has been initially read, and is output from the second moving image signal output terminal. The moving image signal output from the second moving image signal output terminal is processed by the second image processing unit 203b of the image processing unit 203 and is output to the display unit 204, resulting in the display of an image (a live view image) on the display unit 204.

In the operation illustrated in FIG. 9, in one cycle period of still image photographing, one still image signal and six moving image signals are obtained. FIG. 9 illustrates an aspect in which a process is repeated using one cycle period of still image photographing as a unit of processing.

As described above, in the first reading mode illustrated in FIG. 9, by a control signal output from the vertical scanning circuit 1, pixel exposure is controlled such that exposure periods for still images of all pixels are equal to one another, and the reading of the still image signal and the moving image signal is controlled in units of fields. Moreover, in the first reading mode, by the control signal output from the vertical scanning circuit 1, the still image signal is controlled to be read using the first output system in units of fields and the moving image signal is controlled to be read using the second output system in units of fields.

Figure 11:
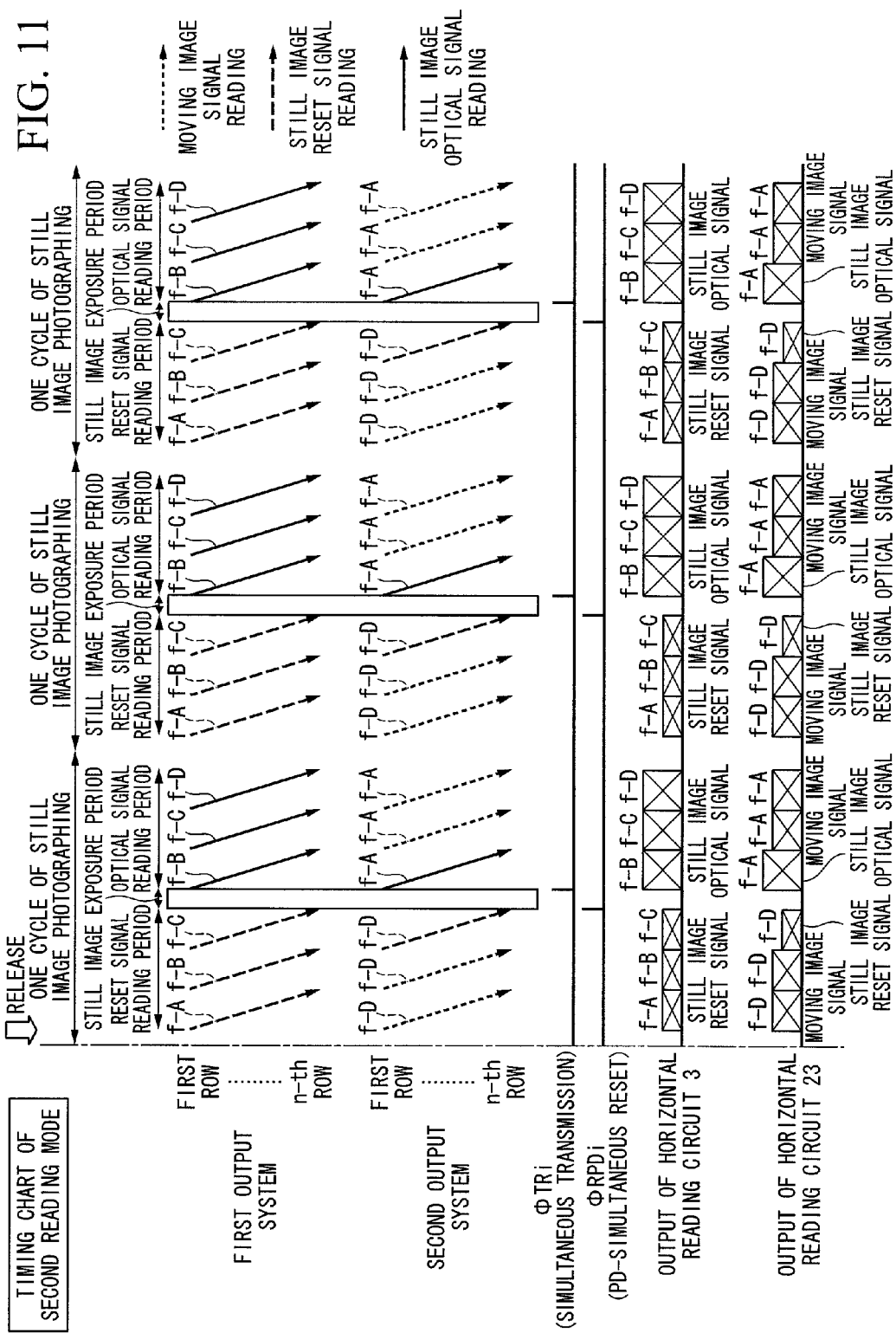
FIG. 11 is a timing chart illustrating the operation of an image pickup device in accordance with a preferred embodiment of the present invention.

FIG. 11 illustrates an operation in the second reading mode. In FIG. 11, a horizontal axis denotes time. FIG. 11 illustrates a pixel signal reading timing using the first output system and a pixel signal reading timing using the second output system. Furthermore, FIG. 11 illustrates timings at which the row transmission pulse φTRi and the PD reset pulse φRPDi are simultaneously applied to all pixels. FIG. 11 illustrates the output signal of the horizontal reading circuit 3 constituting the first output system and the output signal of the horizontal reading circuit 23 constituting the second output system. An operation illustrated in FIG. 11 is an operation when all pixels have been divided into four fields.

In the second reading mode illustrated in FIG. 11, a still image signal is read using the first output system and the second output system, and a moving image signal is read only using the second output system. In the operation illustrated in FIG. 11, the first output system is used and the global shutter operation illustrated in FIG. 5 is performed, so that a reset signal for a still image is read in the reset signal reading period in sequence of the first field (f-A), the second field (f-B), and the third field (f-C), and an optical signal for a still image is read in the optical signal reading period in sequence of the second field (f-B), the third field (f-C), and the fourth field (f-D).

Meanwhile, in the operation illustrated in FIG. 11, the second output system is used and the rolling shutter operation illustrated in FIG. 7 is performed, so that a moving image signal is read in the reset signal reading period using the pixels of the fourth field (f-D) and is output from the second moving image signal output terminal. Next, the global shutter operation illustrated in FIG. 5 is performed, so that a reset signal for a still image is read using the pixels of the fourth field (f-D).

Furthermore, the second output system is used and the global shutter operation illustrated in FIG. 5 is performed, so that a reset signal for a still image is read in the optical signal reading period using the pixels of the first field (f-A). Next, the rolling shutter operation illustrated in FIG. 7 is performed, so that a moving image signal is read using the pixels of the first field (f-A) and is output from the second moving image signal output terminal.

In this way, the moving image signals output from the second moving image signal output terminal are processed by the second image processing unit 203b of the image processing unit 203 and is output to the display unit 204, resulting in the display of an image (a live view image) on the display unit 204.

Furthermore, the difference circuit 6 generates a still image signal including a difference between the optical signals of the second field (f-B), the third field (f-C), and the fourth field (f-D) output from the AD conversion circuit 4, and the reset signals of corresponding fields held in the frame memory 5, and outputs the still image signal through the first still image signal output terminal. The difference circuit 7 generates a still image signal including a difference between the optical signals of the first field (f-A) output from the AD conversion circuit 24, and the reset signals of the first field (f-A) held in the frame memory 5, and outputs the still image signal through the second still image signal output terminal. The still image signals of the fields output from the first still image signal output terminal and the second still image signal output terminal are processed by the first image processing unit 203a of the image processing unit 203, so that one still image signal is recorded on the memory card 209.

In the operation illustrated in FIG. 11, in one cycle period of still image photographing, one still image signal and four moving image signals are obtained. FIG. 11 illustrates an aspect in which a process is repeated using one cycle period of still image photographing as a unit of processing.

As described above, in the second reading mode illustrated in FIG. 11, by a control signal output from the vertical scanning circuit 1, pixel exposure is controlled such that exposure periods for still images of all pixels are equal to one another, and the reading of the still image signal and the moving image signal is controlled in units of fields. Moreover, in the second reading mode, by the control signal output from the vertical scanning circuit 1, the still image signal is controlled to be read using the first output system and the second output system in units of fields and the moving image signal is controlled to be read using the second output system in units of fields.

In the second reading mode illustrated in FIG. 11, it is possible to simultaneously read and output the reset signals and the optical signals for still images of a plurality of fields using the two output systems, so that it is possible to reduce one cycle period of still image photographing and to reduce a still image photographing time, as compared with the first reading mode. As described above, the reading mode is set by the setting unit 8. For example, it is normal that the first reading mode is set, and it is sufficient if the second reading mode is set when priority is given to a photographing speed.

Figure 12:
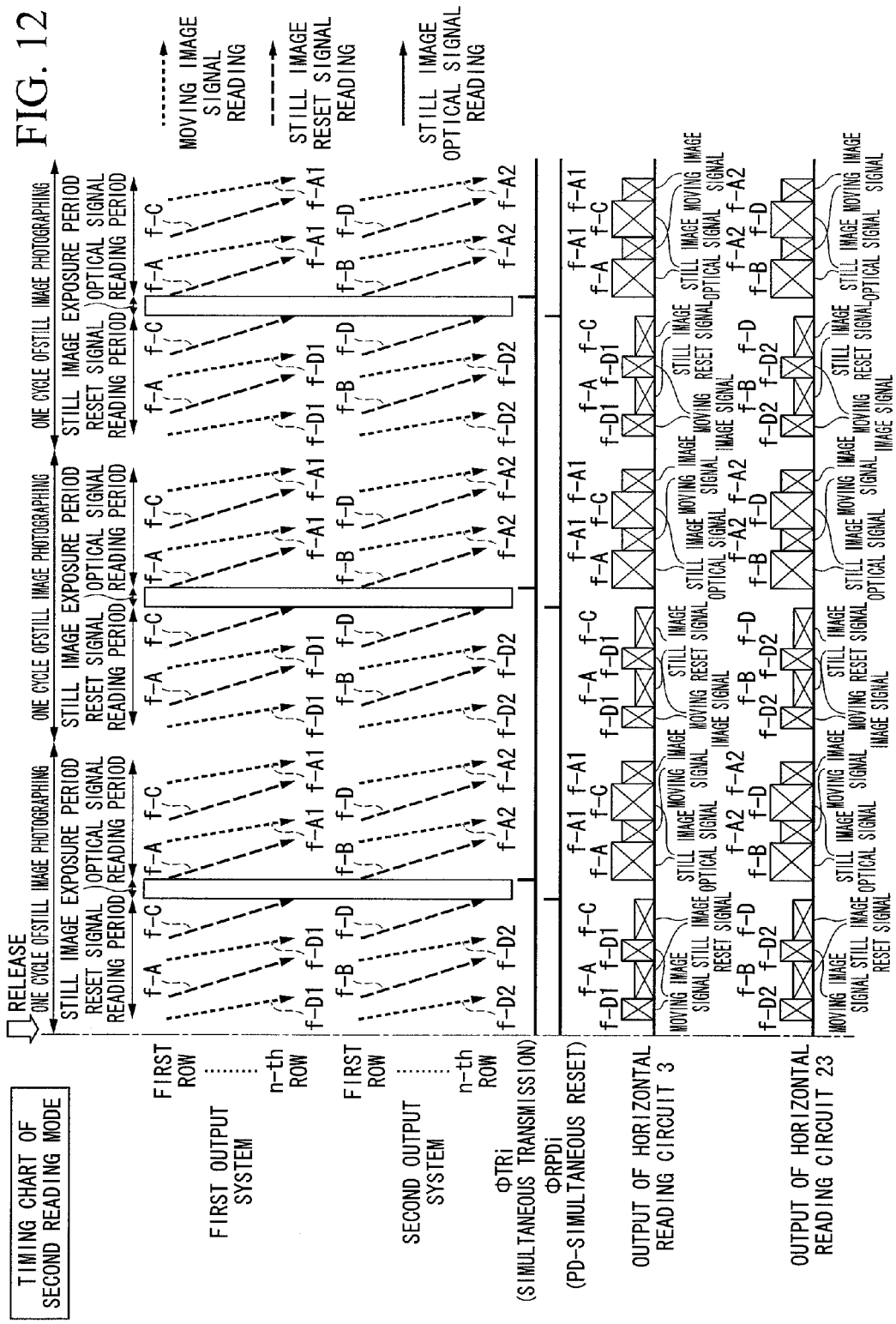
FIG. 12 is a timing chart illustrating the operation of an image pickup device in accordance with a preferred embodiment of the present invention.
Figure 13:
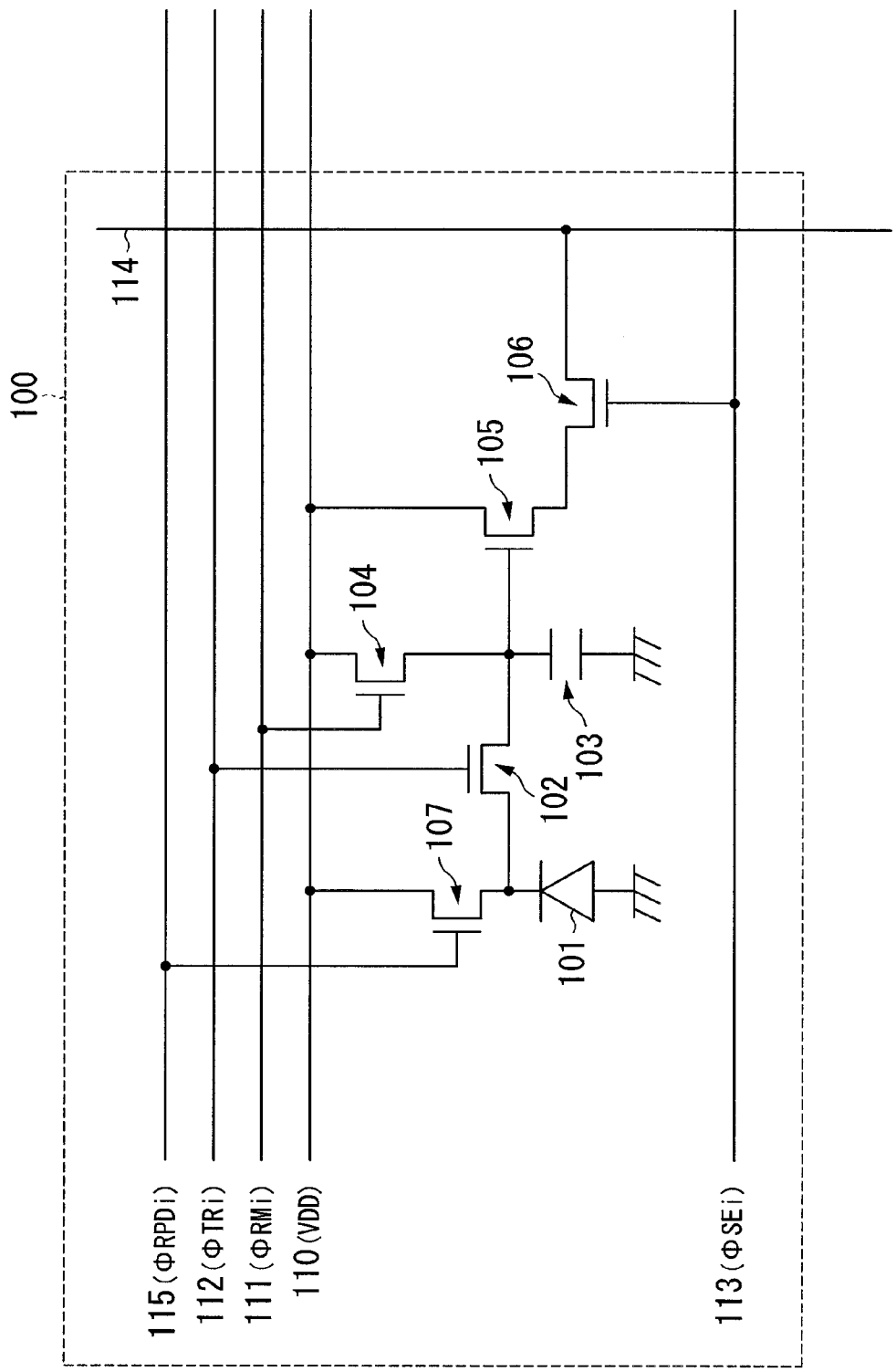
FIG. 13 is a circuit diagram illustrating the configuration of a pixel in the related art.
Figure 14:
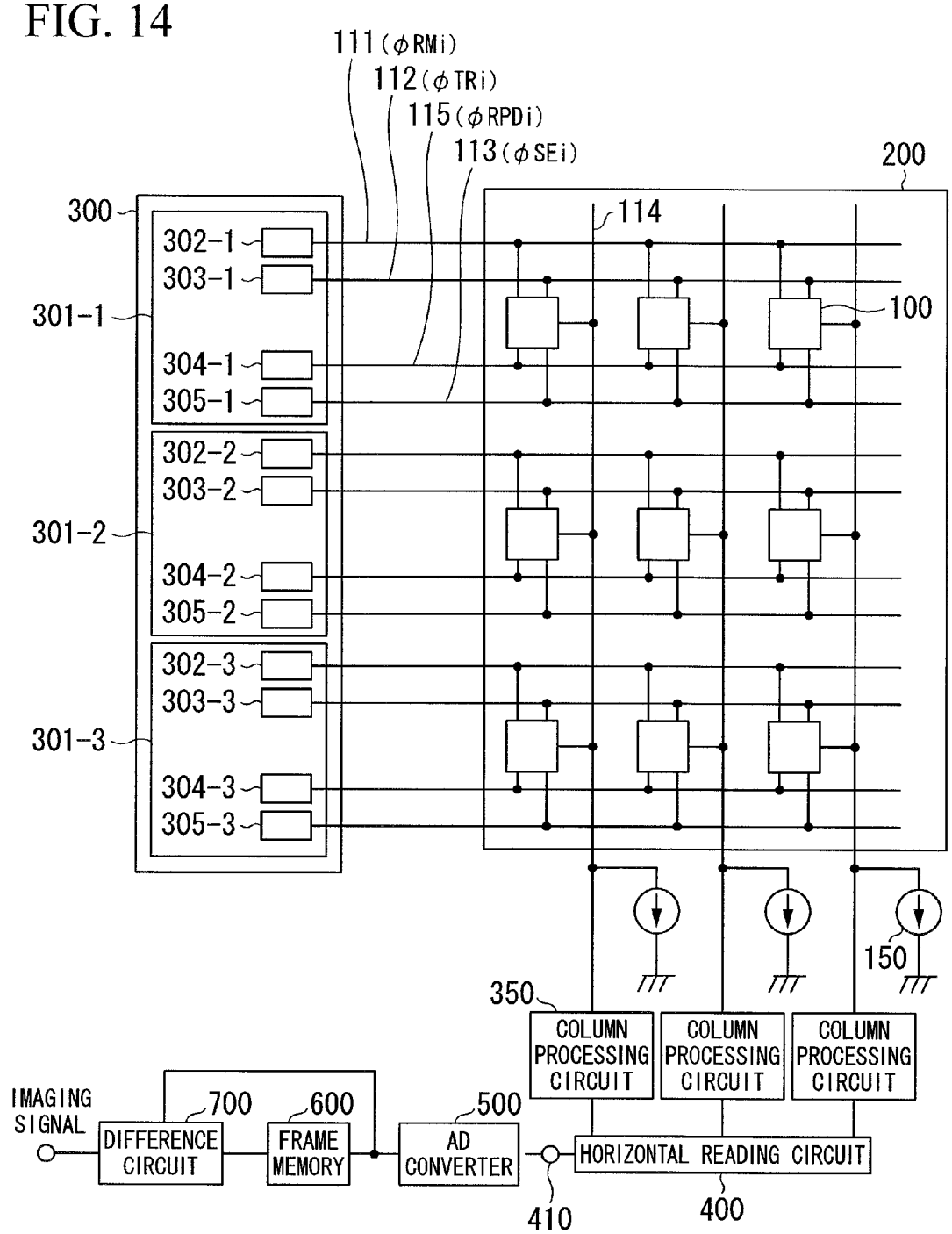
FIG. 14 is a block diagram illustrating the configuration of a solid-state image pickup device in the related art.
Figure 15:
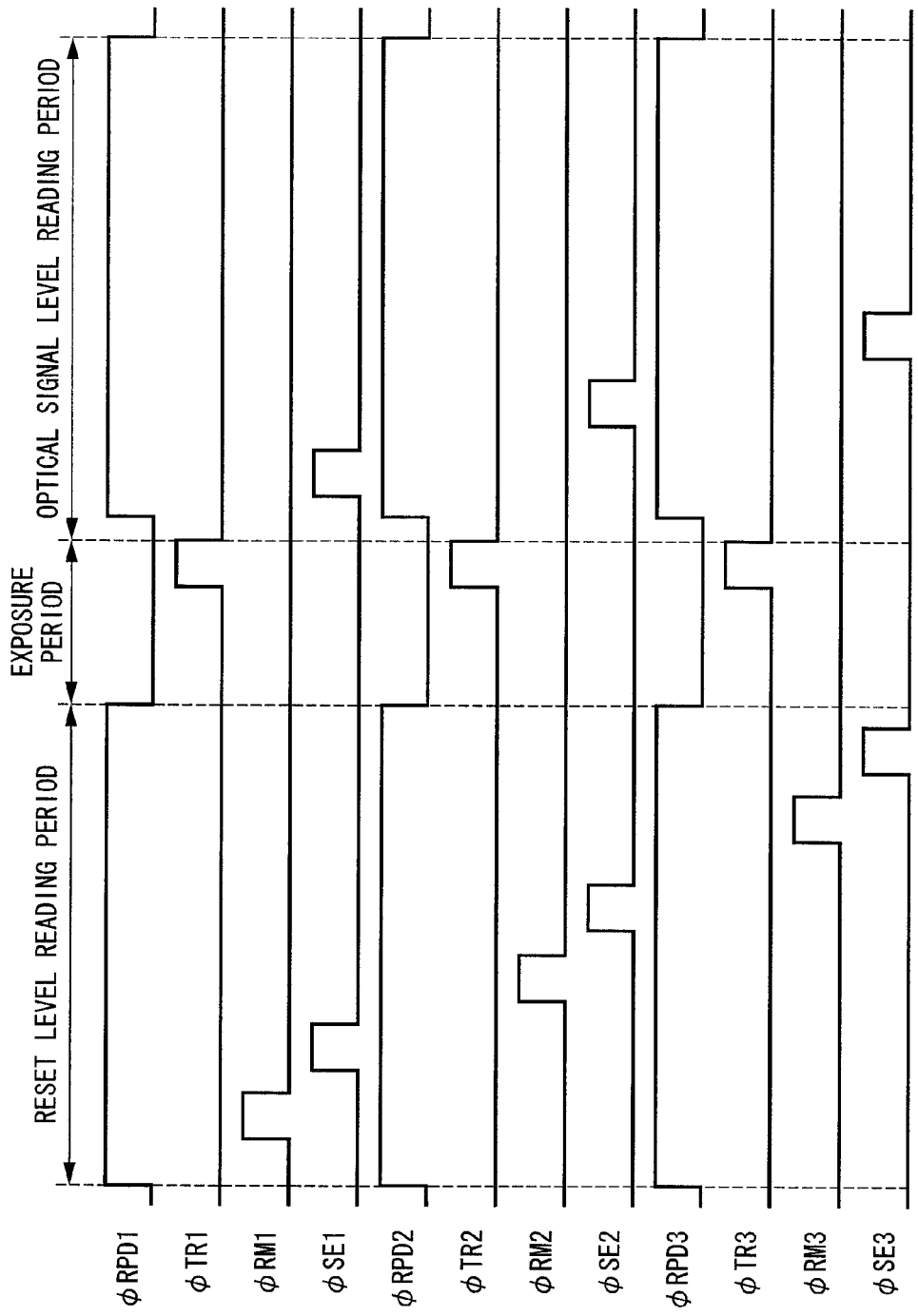
FIG. 15 is a timing chart illustrating the operation of a solid-state image pickup device in the related art.

Next, a modification of the preferred embodiment will be described. FIG. 12 illustrates an operation in the second reading mode different from the operation illustrated in FIG. 11. In FIG. 12, a horizontal axis denotes time. FIG. 12 illustrates a pixel signal reading timing using the first output system and a pixel signal reading timing using the second output system. Furthermore, FIG. 12 illustrates timings at which the row transmission pulse $\phi TRi$ and the PD reset pulse $\phi RPDi$ are simultaneously applied to all pixels. FIG. 12 illustrates the output signal of the horizontal reading circuit 3 constituting the first output system and the output signal of the horizontal reading circuit 23 constituting the second output system.

An operation illustrated in FIG. 12 is an operation when all pixels have been divided into four fields. The field division is the same as that illustrated in FIG. 10. In the operation illustrated in FIG. 11, a moving image signal is read using only the second output system. However, in the operation illustrated in FIG. 12, a field from which the moving image signal is read is further divided into two, and a moving image signal of each field is read using the first output system and the second output system.

In the operation illustrated in FIG. 12, the first output system is used and the rolling shutter operation illustrated in FIG. 7 is performed, so that a moving image signal is read in the reset signal reading period using pixels of a field f-D1 which is one of the two fields obtained by dividing the fourth field (f-D), and is output from the first moving image signal output terminal. Next, the global shutter operation illustrated in FIG. 5 is performed, so that a reset signal for a still image is read using pixels of the first field (f-A). Next, the moving image signal is read using the pixels of the field f-D1, and the reset signal for a still image is further read using pixels of the third field (f-C).

Furthermore, the first output system is used and the global shutter operation illustrated in FIG. 5 is performed, so that the reset signal for a still image is read in the optical signal reading period using the pixels of the first field (f-A). Next, the rolling shutter operation illustrated in FIG. 7 is performed, so that the moving image signal is read using pixels of a field f-A1 which is one of the two fields obtained by dividing the first field (f-A), and is output from the first moving image signal output terminal. Next, the reset signal for a still image is read using the pixels of the third field (f-C), and the moving image signal is further read using the pixels of the field f-A1.

Meanwhile, in the operation illustrated in FIG. 12, the second output system is used and the rolling shutter operation illustrated in FIG. 7 is performed, so that the moving image signal is read in the reset signal reading period using pixels of a field f-D2 which is the other one of the two fields obtained by dividing the fourth field (f-D), and is output from the second moving image signal output terminal. Next, the global shutter operation illustrated in FIG. 5 is performed, so that the reset signal for a still image is read using pixels of the second field (f-B). Next, the moving image signal is read using the pixels of the field f-D2, and the reset signal for a still image is further read using pixels of the fourth field (f-D).

Furthermore, the second output system is used and the global shutter operation illustrated in FIG. 5 is performed, so that the reset signal for a still image is read in the optical signal reading period using the pixels of the second field (f-B). Next, the rolling shutter operation illustrated in FIG. 7 is performed, so that the moving image signal is read using pixels of a field f-A2 which is the other one of the two fields obtained by dividing the first field (f-A), and is output from the second moving image signal output terminal. Next, the reset signal for a still image is read using the pixels of the fourth field (f-D), and the moving image signal is further read using the pixels of the field f-A2.

In this way, the moving image signals output from the first moving image signal output terminal and the second moving image signal output terminal are processed by the second image processing unit 203b of the image processing unit 203 and are output to the display unit 204, resulting in the display of an image (a live view image) on the display unit 204.

Furthermore, the difference circuit 6 generates a still image signal including a difference between the optical signals of the first field (f-A) and the third field (f-C) output from the AD conversion circuit 4, and the reset signals of corresponding fields held in the frame memory 5, and outputs the still image signal through the first still image signal output terminal.

The difference circuit 7 generates a still image signal including a difference between the optical signals of the second field (f-B) and the fourth field (f-D) output from the AD conversion circuit 24, and the reset signals of corresponding fields held in the frame memory 5, and outputs the still image signal through the second still image signal output terminal. The still image signals of the fields output from the first still image signal output terminal and the second still image signal output terminal are processed by the first image processing unit 203a of the image processing unit 203, so that one still image signal is recorded on the memory card 209.

In the operation illustrated in FIG. 12, in one cycle period of still image photographing, one still image signal and four moving image signals are obtained. FIG. 12 illustrates an aspect in which a process is repeated using one cycle period of still image photographing as a unit of processing.

In the second reading mode illustrated in FIG. 11, it is possible not only to simultaneously read and output the reset signals and the optical signals for still images of a plurality of fields using the two output systems, but also to simultaneously read and output the moving image signals of the plurality of fields using the two output systems, so that it is possible to reduce one cycle period of still image photographing and to reduce a still image photographing time, as compared with the first reading mode.

In addition, in the operations illustrated in FIGS. 9, 11, and 12, one cycle period of still image photographing is repeated plural times. However, an operation in one cycle period of still image photographing may also be performed only once. Furthermore, a period for performing other processes may also be provided between one cycle period of still image photographing and a subsequent one cycle period of still image photographing. Furthermore, it is possible to appropriately change the number of fields, an order of fields from which pixel signals are read, a combination of fields read by the first output system and the second output system, and the like.

As described above, in the second reading mode of the preferred embodiment, in at least one of a plurality of periods (periods assigned to fields) in which reset signals and optical signals for still images are read in units of fields, the reading of still image signals is controlled such that the reset signals and the optical signals are read using both the first output system and the second output system in units of fields, so that it is possible to reduce a still image photographing time.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A solid-state image pickup device comprising:
   a pixel unit in which pixels are arranged in a two-dimensional manner, the pixels including a photoelectric conversion element configured to convert light into signal charge and accumulating the signal charge, a charge holding unit configured to hold the signal charge accumulated in the photoelectric conversion element, a transmission unit configured to transmit the signal charge accumulated in the photoelectric conversion element to the charge holding unit, and a first output unit and a second output unit configured to output a pixel signal as a still image signal or a moving image signal based on the signal charge held in the charge holding unit;
   a first processing unit configured to read and process the still image signal or the moving image signal which is output from the first output unit;
   a second processing unit configured to read and process the still image signal or the moving image signal which is output from the second output unit; and
   a control unit configured to control exposure of the pixels such that exposure periods for still images of all pixels constituting an area to be read are equal to one another, and control reading of the still image signal and reading of the moving image signal in units of fields, the all pixels constituting the area to be read being divided into a plurality of fields, in such a manner that the still image signal is to be read from both the first output unit and the second output unit in units of fields in at least one of a plurality of periods in which the still image signal of one field is read, and the moving image signal is to be read from at least one of the first output unit and the second output unit in units of fields in a plurality of periods in which the moving image signal of one field is read.

2. The solid-state image pickup device according to claim 1, wherein the control unit controls the reading of the moving image signal in such a manner that the moving image signal is to be read from both the first output unit and the second output unit in units of fields in at least one of the plurality of periods in which the still image signal of one field is read.

3. The solid-state image pickup device according to claim 1, wherein
   the solid-state image pickup device can set a first mode and a second mode,
   if the first mode is set, then the control unit controls the reading of the still image signal in such a manner that the still image signal is to be read from one of the first output unit and the second output unit in units of fields in the plurality of periods in which the still image signal of one field is read and controls the reading of the moving image signal in such a manner that the moving image signal is to be read from a remaining one of the first output unit and the second output unit in units of fields in the plurality of periods in which the moving image signal of one field is read, and
   if the second mode is set, then the control unit controls the reading of the still image signal in such a manner that the still image signal is to be read from both the first output unit and the second output unit in units of fields in at least one of the plurality of periods in which the still image signal of one field is read, and controls the reading of the moving image signal in such a manner that the moving image signal is to be read from at least one of the first output unit and the second output unit in units of fields in the plurality of periods in which the moving image signal of one field is read.

4. An image pickup device comprising the solid-state image pickup device according to claim 1.

* * * * *